Nov. 14, 1967 S. T. MEYERS ETAL 3,353,102

FREQUENCY SHIFT RECEIVER WITH NOISE FREQUENCY DETECTION

Filed Dec. 26, 1963

INVENTORS S. T. MEYERS
J. P. RATZLAFF
BY J. P. Kearns
ATTORNEY

United States Patent Office 3,353,102
Patented Nov. 14, 1967

3,353,102
FREQUENCY SHIFT RECEIVER WITH NOISE FREQUENCY DETECTION

Stanley T. Meyers, East Orange, and Jerry P. Ratzlaff, Eatontown, N.J., assignors to Bell Telephone Laboratories, Incorporated, New York, N.Y., a corporation of New York Filed Dec. 26, 1963, Ser. No. 333,543
9 Claims. (Cl. 325—320)

ABSTRACT OF THE DISCLOSURE

A carrier frequency detector in which a frequency shift data signal is serially passed through a bandpass filter, an equalizer, a limiter, a differentiator and rectifier, and a monopulser to provide a pulse train having a repetition frequency proportional to the instantaneous frequency of the frequency shift signal. The pulse train is lowpass filtered to convert it into a D-C data signal.

The D-C data signal is both applied to a gated output amplifier and a region detector. The region detector inhibits the output amplifier if the D-C data signal falls outside a predetermined region.

This invention relates generally to the reception of frequency-shift data signals and in particular to the detection of a carrier signal for circuit assurance against noise.

Data transmission in the voice-frequency band over the switched telephone network is increasing in importance. One of the serious problems encountered in the sharing of the telephone network by both voice and data is that of noise.

Impulse noise particularly is generated in the switching of calls in telephone central offices. Such noise is of little consequence in a voice call, but in a data call impulse noise can create spurious data.

A much-favored data transmission mode is by frequency-shift techniques in which the binary data bits are represented by one of two frequencies within the voice band. The highest transmission rate that the bandwidth of the transmission facility will permit is generally sought. Within the limits of the voice-frequency transmission band frequencies are chosen to take advantage of the known attenuation and delay characteristics of the telephone network. The frequencies chosen to encode the marking and spacing bits should each be subject to the same attenuation and delay in traversing the transmission facility. The common choice for such frequencies in the upper middle portion of the voice-frequency band results in a transmission speed comparable to these frequencies. Consequently only one or two cycles of encoding frequency are available per data bit. A few pulses of impulse noise, therefore, can readily mask or simulate a data bit. In addition, high-pitched speech cross-talked from a neighboring line can also simulate a data bit.

Carrier frequency detectors have been provided in data signal receivers to give an indication of the presence or absence of carrier. The detector outputs are used to control a clamp on the receiver to forestall response to non-data signals. However, due to the spread between marking and spacing frequencies these detectors generally give an indication of the presence of data for any signal which exceeds the receiver threshold level.

It is an object of this invention to refine carrier detection circuits for data receivers and to use their indications as a margin against noise and speech simulation of data.

It is another object of this invention to distinguish between legitimate data and noise or speech.

According to this invention, the presence of carrier frequency is indicated only when the received frequency lies between the bounds defined by the chosen marking and spacing frequencies. Signals of frequencies outside these bounds, regardless of level, cannot produce a carrier-present indication. Signals within these bounds can only produce a carrier-present indication when they persist for a predetermined minimum length of time.

From the output of a zero-crossing detector in the signal receiver a direct current inversely proportional to the incoming frequency is obtained. A three-region threshold detector evokes different responses depending on whether this direct current lies within the bounds defined by the marking and spacing frequencies or lies beyond the upper or the lower bound. The three-region detector produces one output if the direct current lies within the proper bounds and another output if the direct current falls outside these bounds. The detector output is integrated to prevent the overall output from changing instantaneously. A signal within bounds therefore must persist for a predetermined minimum time before a carrier-present indication is given and a signal outside the bounds must persist for another predetermined minimum time before the carrier-present indication is removed. A binary switch is controlled by the integrator to provide the carrier-present output signal.

An end-of-transmission feature can be provided by the carrier-present circuit of this invention by deliberately transmitting a frequency outside the data range. This will be recognized by the three-region detector and give the carrier-off indication. In previous carrier detector circuits mere removal of carrier at the end of transmission often resulted in the production of a final spurious data bit.

A feature of this invention is that noise pulses tending to drive the receiver output beyond the data region are detected and thus the receiver clamp can be applied to prevent receipt of data even in the presence of carrier when the signal-to-noise ratio is low.

A full appreciation of this invention together with its objects, features and advantages will be obtained from the following detailed description and the drawing in which.

Figures 1, 2, 3:
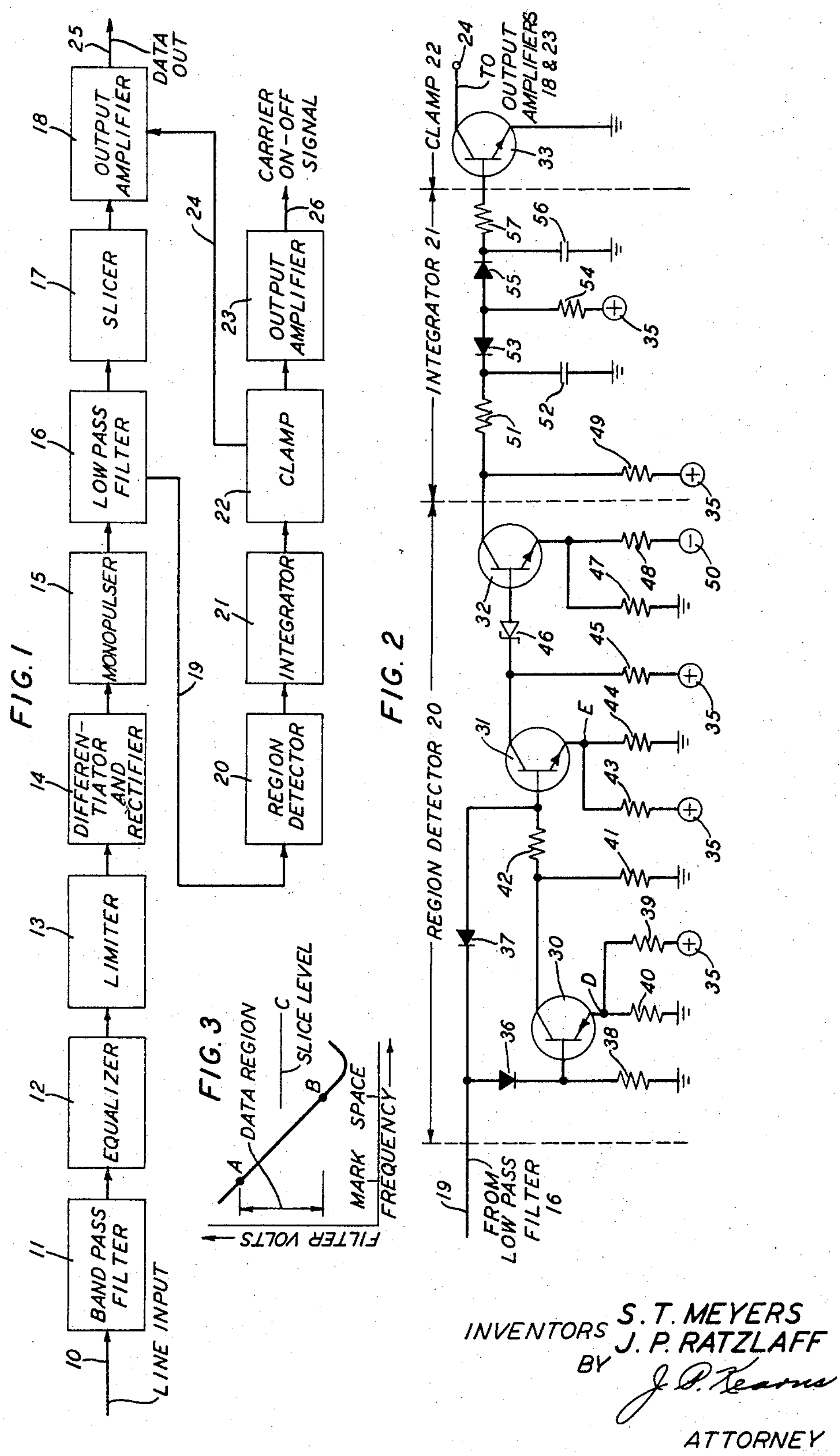
FIG. 1 is a block diagram of a representative frequency-shift data rceiver and the carrier detector circuit of this invention.
FIG. 2 is a circuit diagram of an illustrative embodiment of the three-region carrier detector of this invention.
FIG. 3 is a graph of the amplitude-frequency characteristic of a zero-crossing detector for a data receiver to which the carrier detector of this invention is applicable.

A representative line signal on which the carrier detector of this invention operates is a two-frequency signal in which one frequency, such as 1200 cycles, represents a marking or "one" bit and another frequency, such as 2200 cycles, represents a spacing or "zero" bit. The transmission rate in bits per second can be as high as 1200. Thus, there is at the highest transmission rate one cycle of carrier per bit at the marking frequency and somewhat less than two cycles of carrier per bit at the spacing frequency.

For a receiver operating on a frequency-shift signal having such a small ratio of carrier frequency to transmission rate a zero-crossing detector is a practical embodiment. FIG. 1 shows in block diagram form a representative zero-crossing detector to which the carrier detector of this invention can be applied.

The frequency-shift signal encoding the transmitted data is received over a transmission line 10, is filtered in bandpass filter 11 to reduce the effects of noise outside the data band, and is equalized in equalizer 12 to correct for any delay or amplitude distortion imparted by the transmission line. The corrected frequency response should be flat at least at the marking and spacing frequencies. The signal is further limited in limiter 13 to to obtain sharp transitions in the received wave. The limiter output is differentiated to obtain positive and negative spikes at the respective positive-going and negative-going transitions in the resultant square wave. These spikes are rectified in differentiator and rectifier 14. The rectified pulses trigger a one-shot multivibrator or monopulser 15 which generates a pulse of uniform duration for each such rectified pulse.

The monopulser output is integrated in low-pass filter 16 to obtain a direct-current signal of varying level according to the amplitude-frequency characteristic of FIG. 3. The output of the filter is seen to vary inversely with the frequency of the signal received on line 10. As the input frequency increases from the low-frequency side, the output voltage decreases. At rest with no input frequency from the line the output voltage is high. At point A, corresponding in a representative system to the chosen marking frequency, the output voltage has fallen to define the upper limit of the data region. At point B, corresponding to the frequency chosen for the spacing frequency, the output voltage has fallen to about half the voltage at the marking frequency to define the lower limit of the data region. The curve eventually bottoms out as the frequency is increased further because the period of the monopulser and the time between zero-crossing pulses finally coincide.

In the receiver proper the output of low-pass filter 16 is applied to slicer 17 which changes state as the signal level crosses the level C about halfway between the marking and spacing frequency output voltages. When undistorted, error-free data is being received, the output of low-pass filter 16 occupies the marking and spacing levels and also the intervening region during transitions. During good reception, therefore, voltage magnitudes above the marking level and below the spacing level should not occur. Noise pulses, however, have the effect of forcing the output out of this data region. Therefore, by appropriate detection of signal levels outside the data region the presence of noise or a badly distorted data signal is revealed. A single data error is not inevitably indicated by signals outside the data region, but the probability of multiple errors is increased when continuous signals in the nondata region are detected.

The output of slicer 17 is appropriately amplified in amplifier 18 to the level necessary to operate an associaated business machine connected to terminal 25. The output amplifier is made subject to clamping or lock-out by the operation of the carrier detector circuit of this invention.

The output of the low-pass filter 16 on line 19 is applied to a carrier detector circuit including region detector 20, integrator 21, clamp 22 and output amplifier 23. In region detector 20 threshold levels substantially at the potentials of points A and B on FIG. 3 are established. The region detector can assume one of two output states depending on whether the input level lies between potentials A and B or beyond these levels. This two-state output is integrated or smoothed in block 21 to operate or release clamp 22. When clamp 22 is operated by signals falling outside the data region, output amplifier 18 in the main signal path is blocked. Signals within the data region release the clamp on amplifier 18. Output amplifier 23 delivers the clamp output to an associated business machine as an indication that a message is waiting, is being received or has terminated. In addition, it can indicate that spurious data is being received.

FIG. 2 illustrates a particular practical embodiment of a region detector and integrator according to this invention. Region detector 20 includes transistors 30, 31 and 32 together with diodes 36, 37 and 46. Integrator 21 includes capacitors 52 and 56 together with diodes 53 and 55 and resistors 49, 51, 54 and 57. Clamp 22 includes transistor 33.

The two threshold levels corresponding to points A and B in FIG. 3 and defining the boundaries between the data region and the upper and lower nondata regions are established by resistors 39, 40, 43 and 44. The junction D of resistors 39 and 40 connected between positive potential source 35 and ground reference is held at a level just above potential A. The potential at point D provides a fixed bias for the emitter of p-n-p junction transistor 30. Similarly, the junction E of resistors 43 and 44 connected between positive potential source 35 and ground reference is held at a level just below potential B. The potential at point E provides a fixed bias for the emitter of n-p-n junction transistor 31. Since the base electrode of transistor 30 is connected to a resistor-diode network, including resistor 38 and diode 36, transistor 30 is biased into the nonconducting state as long as the output of low-pass filter 16 appearing on lead 19 at the anode of diode 36 is above potential A. This corresponds to the rest state—no data being received—of the overall data receiver.

Transistor 31 at this time is also nonconducting because diode 37 joining the input lead 19 to the base electrode of transistor 31 is back-biased. Moreover, the base electrode of transistor 31 is returned to ground through resistors 42 and 41. The junction of resistors 42 and 41 connects to the collector electrode of transistor 30.

The base electrode of n-p-n junction transistor 32 is connected to the collector electrode of transistor 31 through Zener diode 46. Since transistor 31 is nonconducting transistor 32 is held in conduction by base current from positive supply 35 through resistors 45 and Zener diode 46. The breakdown voltage of diode 46 is chosen a few volts below the potential of source 35. The emitter electrode of transistor 32 is biased negatively by the voltage divider including resistors 47 and 48 connected between negative potential source 50 and ground reference. Its collector electrode is connected to positive potential source 35 through load resistor 49. Therefore, transistor 32 is in the conducting state when the input voltage on line 19 is above potential A, i.e., in the upper nondata region. The potential at its collector electrode is substantially that of its emitter electrode which is at the negative voltage of the junction of resistors 47 and 48. This is the indication for the nondata region.

When the potential on line 19 drops below potential A, diode 36 becomes back-biased since potential D is now higher than the line potential. Transistor 30 thereupon becomes conducting and its collector voltage rises to potential D. Potential D is more positive than potential E so that transistor 31 also becomes conducting as a result of the forward base current through resistor 42. The collector voltage of transistor 31 falls to potential E. Base drive is thereby removed from transistor 32, which becomes nonconducting. Its collector voltage rises to that of supply 35 and gives the data region indication.

This indication continues as long as the signal on line 19 exceeds potential E.

A still further drop in potential on line 19 below potential D continues to back bias diode 36 and allow transistor 30 to remain conducting. However, below potential E diode 37 becomes forward biased, thereby withdrawing base drive from transistor 31, which becomes nonconducting. Its collector potential rises and transistor 32 once again saturates and its collector potential goes negative for the nondata region indication.

In summary the collector potential of transistor 32 is negative when the incoming frequency is outside the data region and positive when it is within the data region.

The collector of transistor 32 drives integrator 21, which comprises capacitors 52 and 56, diodes 53 and 55 and resistors 49, 51, 54 and 57. For the negative nondata region indication diode 53 becomes forward biased through resistor 51, which in turn back biases diode 55 to withdraw base current from n-p-n junction transistor 33. Transistor 33 is the clamping transistor and when it is off or nonconducting, output amplifier 18 in the main signal receiver is inoperative so that no erroneous data is passed to the associated business machine. The emitter of transistor 33 is grounded and its collector is connected to terminal 24.

When the collector potential at the input to the integrator is positive and indicates that the incoming signal is in the data region, capacitor 52 charges positively toward the supply potential through resistors 49, 51, 54 and diode 53, which is forward biased. The potential across capacitor 52 eventually reaches a level at which diode 55 and the base emitter junction of transistor 33 are forward biased. The collector potential of transistor 33 falls to ground and allows output amplifier 18 to become operative. Diode 53 also becomes back-biased and capacitor 52 continues to charge until it reaches the positive supply potential. Capacitor 56 acquires a small charge through resistor 54 and diode 55.

When the collector potential of transistor 32 at the integrator input goes negative and indicates that the incoming signal has dropped out of the data region, capacitor 52 begins discharging through transistor 32. Diode 53 again becomes forward biased and diode 55, back biased. Capacitor 56 discharges through resistor 57 and the base-emitter circuit of transistor 33 and holds it in saturation for a short interval after the received signal leaves the data region as determined by the value of resistor 57.

Integrator 21 thus determines the length of time for the potential on capacitor 52 to rise to a level which back biases diode 53. The release time is similarly determined by the discharge time of capacitor 56. Short drop-outs occurring on the telephone line do not immediately open the clamp.

The value chosen for resistor 51 determines the discharge time of capacitor 52 and prevents a single impulse noise spike from applying the clamp each time the incoming signal is forced out of the data region. Resistor 51, on the other hand, cannot be made too large or it will allow the clamp to be applied on white noise alone. The value can be optimally chosen to turn on the clamp for a particular minimum allowable signal-to-noise ratio.

Due to the presence of resistor 57 in series with the base electrode of transistor 33, there is a delay in the turn-off of that transistor at the end of signal reception. In many cases, due to transients set up on the telephone line by the stopping of the transmitter and sometimes due to noise hits, the receiver can give a false space indication. With the carrier detector of this invention, it is possible to program an end-of-transmission sequence to eliminate such false space indications.

If the transmitter frequency is intentionally moved to a frequency below marking before turning it off, the clamp can be applied to the receiver by a positive signal before the transmitter is stopped. End-of-transmission transients then will be unable to affect the receiver when transmission actually stops.

While this invention has been described with reference to a particular illustrative embodiment, its principles are applicable to a wide range of such embodiments. Neither the relation of marking and spacing frequencies nor the transistor and diode polarization is to be considered limitative.

What is claimed is:

1. A carrier frequency detector responsive to a frequency shift signal in which first and second binary data bit levels are represented by first and second frequencies bounding a first carrier frequency band within a second carrier frequency band for suppressing the effect of carrier signals having frequencies that are both within said second frequency band and outside said first frequency band to provide an output data signal in which said first and second binary data bit levels are represented by first and second amplitudes respectively comprising:

means responsive to said frequency shift signal for providing a potential signal having an amplitude proportional to the frequency thereof;

means responsive to said potential signal, rendered effective by a control signal for providing said output data signal; and means responsive to said potential signal for providing said control signal.

2. A carrier frequency detector as defined in claim 1 in which said control signal providing means includes timing means to prevent a change in said control signal until said potential signal remains within a predetermined range for a first predetermined minimum time.

3. A carrier frequency detector as defined in claim 1 in which said control signal providing means includes additional timing means to prevent a change in said control signal until said potential signal remains outside of a predetermined range for a second predetermined minimum time.

4. A carrier frequency detector responsive to a frequency shift signal in which first and second binary data bit levels are represented by first and second frequencies within a frequency band for providing an output data signal in which said first and second binary data bit levels are represented by first and second amplitudes respectively comprising:

means responsive to said frequency shift signal for providing a potential signal having an amplitude proportional to the frequency thereof;

means responsive to said potential signal, rendered effective by a control signal for providing said output data signal;

a capacitor having one side connected to ground and another side normally biased to a first voltage value;

means responsive to said potential signal entering a predetermined range for applying a current to said capacitor so that said other side of said capacitor varies towards a second voltage value; and means responsive to the voltage on said other side of said capacitor reaching said second value for providing said control signal.

5. A carrier frequency detector responsive to a frequency shift signal in which first and second binary data bit levels are represented by first and second frequencies within a frequency band for providing an output data signal in which said first and second binary data bit levels are represented by first and second amplitudes respectively comprising:

means responsive to said frequency shift signal for providing a potential signal having an amplitude proportional to the frequency thereof;

means responsive to said potential signal, rendered effective by a control signal for providing said output data signal;

a transistor for providing said control signal;

a resistor having one side connected to a base of said transistor;

a capacitor having one side connected to an emitter of said transistor;

means for connecting a second side of said capacitor on a second side of said resistor;

means, normally applying voltage to said second side of said capacitor so as to hold said transistor on when said potential signal remains inside a predetermined range, responsive to said potential signal leaving said predetermined range for removing said applied voltage from said second side of said capacitor.

6. In a receiver for frequency-shift binary code signals, a frequency discriminator producing an output potential proportional to received frequencies at least including the two frequencies used to encode binary signals, and means for clamping the output of said receiver for all frequencies beyond the region bounded by the shift frequencies comprising means establishing a first threshold level corresponding to the presence of one of said frequency-shift frequencies, means establishing a second threshold level corresponding to the presence of the other of said frequency-shift frequencies, a first transistor switch of one conductivity type having its emitter electrode at said first threshold level, a second transistor of the opposite conductivity type having its emitter electrode at said second threshold level and its collector electrode connected to clamp said receiver output when turned on, a first diode connected between said discriminator and the base electrode of said first transistor switch, said first diode becoming forward biased when the output potential of said discriminator exceeds said first threshold level to hold said first transistor switch off, a second diode connected between said discriminator and the base electrode of said second transistor switch, said second diode becoming forward biased when the output potential level falls below said second threshold level to hold said second transistor switch off, and means connecting the collector electrode of said first transistor switch to the base electrode of said second transistor switch, said connecting means cooperating with said second diode to allow said second transistor switch to turn on only when said first transistor switch is on and said second diode is reverse biased.

7. A carrier frequency detector responsive to a frequency shift signal in which first and second binary data bit levels are represented by first and second frequencies within a frequency band for providing an output data signal in which said first and second binary data bit levels are represented by first and second amplitudes respectively comprising:

means responsive to said frequency shift signal for providing a potential signal having an amplitude proportional to the frequency thereof;

means responsive to said potential signal, rendered effective by a control signal for providing said output data signal;

means establishing a first threshold potential corresponding to the said first frequency-shift frequency, means establishing a second threshold potential corresponding to the said second frequency-shift frequency, first switching means associated with said first threshold establishing means changing state when the applied potential falls below said first threshold, second switching means associated with said second threshold establishing means changing state when the applied potential falls below said second threshold, first diode means in series with and poled for forward conduction toward said first switching means, second diode means in series with and poled for reverse conduction toward said second switching means, means interconnecting said first and second switching means, and third switching means responsive to the state of said second switching means for providing said control signal.

8. In combination, a receiver for binary data signals, discriminator means within said receiver having an output potential proportional to frequencies incident thereat, output means for said receiver regenerating a data signal from the output potential of said discriminator means, and carrier detector means responsive to the output potential of said discriminator means rendering said output means operative only when said output potential lies within predetermined limits beyond which no legitimate data signal exists, said carrier detector means comprising means establishing a first threshold level defining one of said predetermined limits, means establishing a second threshold level defining the other of said predetermined limits, first switching means jointly controlled by said first-threshold-level establishing means and the output potential of said discriminator means closing only when said output potential falls below said first threshold level, second switching means jointly controlled by said second-threshold-level establishing means, the closure of said first switching means and the output potential of said discriminator means closing only when said output potential exceeds said second threshold level and said first switching means is closed, clamping means interconnecting said second switching means and said output means operative to enable said output means whenever said second switching means is closed, first timing means interposed between said second switching means and said clamping means determining a predetermined minimum time interval between the closing of said second switching means and the operation of said clamping means, and second timing means interposed between said second switching means and said clamping means determining a further predetermined time interval between the opening of said second switching means and the release of said clamping means.

9. The combination of claim 8 in which an end-of-transmission signal producing an output potential in said discriminator means outside said predetermined carrier detector limits causes the forcible release of said clamping means.

References Cited

UNITED STATES PATENTS

| | | | |
|---|---|---|---|
| 3,095,541 | 6/1963 | Ashcraft | 328—165 X |
| 3,133,205 | 5/1964 | Zrubek | 328—117 X |
| 2,378,298 | 6/1945 | Hilferty | 178—66 |
| 3,004,156 | 10/1961 | Coleman et al. | 325—348 |
| 3,159,789 | 12/1964 | Arakelian | 325—348 X |

JOHN W. CALDWELL, *Primary Examiner.*

ROBERT L. GRIFFIN, *Examiner.*

W. S. FROMMER, *Assistant Examiner.*